(12) United States Patent
Kemper (10) Patent No.: US 12,164,266 B2
(45) Date of Patent: Dec. 10, 2024

(54) MODULE FOR GENERATING AN INTERFERENCE PATTERN FOR PRODUCING A DIGITAL HOLOGRAPHIC IMAGE, A RELATED METHOD, AND A DIGITAL HOLOGRAPHIC MICROSCOPE

(71) Applicant: Westfalische Wilhelms-Universitat Munster, Munster (DE)

(72) Inventor: Bjorn Kemper, Osnabruck (DE)

(73) Assignee: Westfalische Wilhelms-Universitat Munster, Munster (DE)

( * ) Notice: Subject to any disclaimer, the term of this patent is extended or adjusted under 35 U.S.C. 154(b) by 0 days.

(21) Appl. No.: 18/005,131

(22) PCT Filed: Jul. 13, 2021

(86) PCT No.: PCT/EP2021/069390
§ 371 (c)(1),
(2) Date: Jan. 11, 2023

(87) PCT Pub. No.: WO2022/013178
PCT Pub. Date: Jan. 20, 2022

(65) Prior Publication Data
US 2023/0259069 A1    Aug. 17, 2023

(30) Foreign Application Priority Data
Jul. 13, 2020    (LU) .................................. LU101920

(51) Int. Cl.
G03H 1/00      (2006.01)
G03H 1/04      (2006.01)
(52) U.S. Cl.
CPC ......... *G03H 1/0005* (2013.01); *G03H 1/0443* (2013.01); *G03H 2001/005* (2013.01);
(Continued)

(58) Field of Classification Search
None
See application file for complete search history.

(56) References Cited

U.S. PATENT DOCUMENTS

| 2009/0002789 A1 | 1/2009 | Lauer |
| 2016/0266365 A1 | 9/2016 | Nolte |
| 2019/0049896 A1* | 2/2019 | Cheng .................. G03H 1/0005 |

OTHER PUBLICATIONS

Kemper B et al, "Modular digital holographic microscopy system for marker free quantitative phase contrast imaging of living cells", Proceedings of SPIE, IEEE, US, (Jan. 1, 2006), vol. 6191, doi: 10.1117/12.662781, ISBN 978-1-62841-730-2, p. 61910T-1, XP003027053.

(Continued)

*Primary Examiner* — Dakshesh D Parikh
(74) *Attorney, Agent, or Firm* — Riverside Law LLP (57) ABSTRACT

In various embodiments a module for generating an interference pattern for producing a digital holographic image is provided. The module comprises an adaptive lens arrangement configured to receive, from a microscope, an object wave of an intermediate image of a sample to be examined, and to generate an adapted object wave of the intermediate image of the sample by reducing a curvature of the object wave of the intermediate image; a reference input interface configured to receive an optical fiber delivering a reference wave from the coherent light source to the module and an interference arrangement configured to generate an interference pattern to be received by an imaging sensor arrangement, wherein the interference pattern is based on the adapted object wave and the reference wave from a coherent light source; wherein a position of the reference input interface of the module is configured to be adjustable with respect to at least two directions (x-y), wherein at least one of the adjustable directions is in parallel to a propagation direction of the reference wave leaving the optical fiber.

14 Claims, 9 Drawing Sheets

(52) U.S. Cl.
CPC . *G03H 2001/0452* (2013.01); *G03H 2223/16* (2013.01); *G03H 2223/17* (2013.01)

(56) References Cited

OTHER PUBLICATIONS

Shaked, Natan T. "Quantitative phase microscopy of biological samples using a portable interferometer." Optics letters 37.11 (2012): 2016-2018.

* cited by examiner

MODULE FOR GENERATING AN INTERFERENCE PATTERN FOR PRODUCING A DIGITAL HOLOGRAPHIC IMAGE, A RELATED METHOD, AND A DIGITAL HOLOGRAPHIC MICROSCOPE

CROSS-REFERENCE TO RELATED APPLICATIONS

This application is a U.S. national phase application filed under 35 U.S.C. § 371 claiming benefit to International Patent Application No. PCT/EP2021/069390, filed Jul. 13, 2021, which is entitled to priority of Luxembourg Patent Application No. LU101920, filed Jul. 13, 2020, the disclosures of which are each incorporated herein by reference in their entirety.

FIELD OF INVENTION

The embodiments described herein relate to the field of digital holographic microscopy (DHM), and in particular to a module for generating an interference pattern for producing a digital holographic image, a related method, and a digital holographic microscope.

BACKGROUND OF THE INVENTION

Current off-axis-based DHM systems cannot be adapted to inverted microscopes without laborious modifications and alignments. For example, current off-axis digital holographic microscopy configurations, if used with different commercial microscopes, require extensive model-specific rebuilding and individual calibration of the mechano-optical components, in particular for usage with objectives with different magnifications. Moreover, for current DHM configurations with commercial microscopes, the change of optical magnification by use of various microscope objectives (mechanical-optical adjustment) is not possible. None of the existing DHM technologies are able to adjust the mechanical-optical system to different microscopic objectives, in particular in combination with commercial inverted microscopes. Stand-alone DHM systems exist, however, for each microscope objective, a separate condenser is used. These drawbacks hinder the usage of DHM for biomedical applications.

SUMMARY

Various embodiments relate to providing an easily adaptable digital holographic microscopy arrangement to various microscopes (e.g. inverted microscopes), and achieves a simplified numerical reconstruction and significant enhanced robustness, and a reduction of phase background aberrations. The embodiments described herein relate to a Digital Holographic Microscopy (DHM) module, which may be based on the off-axis concept, and which may be adaptable to various commercial inverted microscopes. The configuration of the optics described in the embodiments allows the synchronized adaption of the DHM module during the switching of microscopic objectives with different magnifications, which has not been possible with current state of the art off-axis DHM systems and concepts.

Various embodiments described herein relate to module for generating an interference pattern for producing a digital holographic image. The module includes an adaptive lens arrangement configured to receive, from a microscope, an object wave of an intermediate image of a sample to be examined, and to generate an adapted intermediate image of the sample by reducing a curvature of the object wave of the intermediate image. The module further includes an interference arrangement configured to generate an interference pattern to be received by an imaging sensor arrangement, wherein the interference pattern is based on the adapted object wave and a reference wave from a coherent light source. According to various embodiments, the object wave of the intermediate image may include a converging wave front. In general, the adaptive lens arrangement may be configured to adapt the curvature of the object wave of the intermediate image such that the curvature of the object wave of the adapted intermediate image of the sample has a smaller or reduced curvature.

According to some embodiments, the adaptive lens arrangement is configured to receive the intermediate image of the sample from a camera port interface of the microscope, wherein the intermediate image of the sample is based on light waves received by the microscope from an external light source and scattered or diffracted by the sample.

According to some embodiments, the adaptive lens arrangement includes a first lens configured to generate the adapted intermediate image of the sample, wherein the adapted intermediate image has substantially a 1:1 magnification with respect to the intermediate image of the sample. A magnification of substantially 1:1 also encompasses ratios which are smaller or larger than 1:1; such as 1:0.8 and 1:1.2 and any value in between, for example.

According to some embodiments, the first lens of the adaptive lens arrangement is arranged such that a distance between the interface receiving the object wave of the intermediate image and an image plane/sensor plane of the interference arrangement is 4 times the focal length of the first lens. In general, the intermediate image is formed behind (i.e. at a distance measured in the direction of the propagation of the object wave) the camera port interface of the microscope. The first lens may be arranged within the adaptive lens arrangement in such a way that the intermediate image is formed at a distance from the first lens which corresponds to twice its focal length.

According to some embodiments, the first lens of the adaptive lens arrangement includes a biconvex lens.

According to some embodiments, the adaptive lens arrangement further includes a second lens configured to be attached to a camera port interface of the microscope, wherein the first lens of the adaptive lens arrangement is configured to generate the adapted intermediate image based on the intermediate image generated by the second lens of the adaptive lens arrangement.

According to some embodiments, the second lens is configured to generate the intermediate image by adapting light waves from a tube lens of the microscope to a field of view of the imaging sensor arrangement.

According to some embodiments, the interference arrangement includes a beam splitter arranged between the imaging sensor arrangement and a back focal point of the adaptive lens arrangement. The interference arrangement further includes a reference input interface configured to receive an optical fiber delivering the reference wave from the coherent light source to the module.

According to some embodiments, the interference arrangement is configured to generate the interference pattern based on an adjustment of at least one of the beam splitter and the reference input interface of the module to align fringe patterns and fringe frequencies of the adapted object wave and of the reference wave.

According to some embodiments, the beam splitter is configured to be adjustable in at least one axis (x, z or z) to align the fringe patterns and the fringe frequencies of the adapted object wave and the reference wave.

According to some embodiments, a position of the reference input interface of the module is configured to be adjustable with respect to at least two directions (x-y), wherein at least one of the adjustable directions is in parallel to a propagation direction of the reference wave leaving the optical fiber.

According to some embodiments, the position of the reference input interface is configured to be adjusted in parallel to the propagation direction of the reference wave leaving the optical fiber based on an adjustment of a magnification of an objective lens of the microscope.

According to some embodiments, the module further includes the imaging sensor arrangement or wherein the module further includes a sensor interface to be connected to the imaging sensor arrangement, wherein the imaging sensor arrangement includes a 2-dimensional pixel array for detecting the interference pattern and an image processing arrangement for generating a digital holographic image of the sample based on the interference pattern.

Various embodiments described herein relate to a digital holographic microscope including the various embodiments of the module.

Various embodiments relate to a method for generating a digital holographic image of a sample. The method includes arranging, with respect to an optical microscope, a module for generating an interference pattern for a holographic image. The method further includes receiving, by an adaptive lens arrangement of the module, an object wave of an intermediate image of the sample. The method further includes generating, by the adaptive lens arrangement, an adapted intermediate image of the sample by reducing a curvature of the object wave of the intermediate image. The method further includes generating, by an imaging sensor arrangement, a digital holographic image of the sample, based on an interference pattern generated by an interference arrangement of the module, wherein the interference pattern is based on the adapted object wave and a reference wave from a coherent light source. According to various embodiments of the method the object wave of the intermediate image my have a converging wave front.

It is noted that the term digital holographic image as used herein encompasses both amplitude information and phase information of a light wave.

BRIEF DESCRIPTION OF THE DRAWINGS

Further embodiments of the invention will be now described in the following detailed description, wherein.

DETAILED DESCRIPTION

Figure 1:
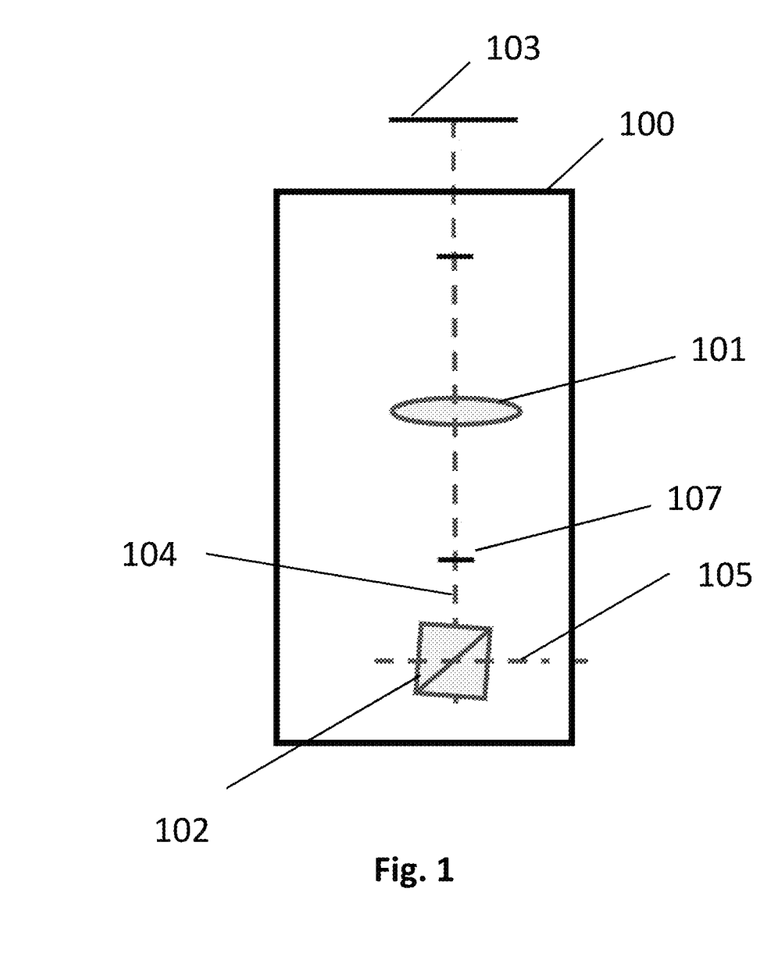
FIG. 1 shows a module for generating an interference pattern for producing a digital holographic image according to various embodiments.

FIG. 1 shows a module 100 for generating an interference pattern for producing a digital holographic image according to various embodiments.

The module 100 includes an adaptive lens arrangement 101 configured to receive, from a microscope, an object wave of an intermediate image 103 of a sample to be examined. The object wave of the intermediate image includes a converging wave front. The adaptive lens arrangement 101 is configured to generate an adapted intermediate image of the sample by adapting a curvature of the object wave of the intermediate image 103. The module 100 further includes an interference arrangement 102 configured to generate an interference pattern to be received by an imaging sensor arrangement. The interference pattern is based on the adapted object wave 104 and a reference wave 105 from a coherent light source.

The module 100 may be a digital holographic microscopy (DHM) module 100 (e.g. a special interferometric unit), which may be used with a microscope to produce an image of the sample based on a hologram generated by the module 100. The module 100 may be configured to be used interchangeably with various optical microscopes, such as an inverted optical microscope. The module 100 may be configured to be arranged with respect to the microscope so that the adaptive lens arrangement 101 may receive the intermediate image 103 of the sample (to be studied or imaged by the microscope) from a camera port interface of the microscope. For example, the module 100 may be configured to be attachable (or attached) to one of the camera port interfaces of the microscope 206.

The object light wave (also referred to as an object wave) related to the intermediate image 103 of the sample may be received by the adaptive lens arrangement 101 of the module 100. The adaptive lens arrangement 101 may include or may be a wave forming element, such as a lens (e.g. a first lens) configured to generate the adapted intermediate image of the sample. The adaptive lens arrangement 101 may be configured to generate an adapted intermediate image of the sample by adapting (or changing) a curvature of the object wave of the intermediate image. In some embodiments, the object wave of the intermediate image 103 received by the adaptive lens arrangement 101 may include (or may have) a converging wave front. In one exemplary scenario, the lens of the adaptive lens arrangement 101 may be a biconvex lens which changes the curvature of the object wave in the intermediate image plane 103 from a converging wave front to a diverging wave front.

Due to the adaptive lens arrangement 101 changing the curvature of the object wave in the intermediate image plane 103, an adapted intermediate image may be generated at the image back focal plane of the adaptive lens arrangement 101. The adapted intermediate image generated by the adaptive lens arrangement 101 may have an approximately 1:1 magnification with respect to the intermediate image 103 of the sample.

The interference arrangement 102 may include (or may be) the beam splitter (also referred to as the first beam splitter), which may be a 50:50 beam splitter cube arranged between the imaging sensor arrangement and a back focal point 107 of the adaptive lens arrangement 101. The beam splitter of the interference arrangement 102 may be configured to generate the interference pattern (also referred to as a hologram) based on the reference wave 105 received by (e.g. entering) the beam splitter and the adapted object wave 104 of the intermediate image received by the beam splitter. The interference pattern, generated by the interaction (or e.g. superposition) of the reference wave 105 and the adapted object wave 104, may be received by the individual pixels of the imaging sensor arrangement. The imaging sensor arrangement (e.g. a camera sensor) may be a digital charge couple device CCD or complementary metal oxide semiconductor CMOS sensor pixel array, for example.

The interference arrangement 102 may further include a reference input interface configured to receive an optical fiber delivering the reference wave 105 from the coherent light source (e.g. a laser) to the module 100. Additionally or optionally, the interference arrangement 102 may be configured to generate the interference pattern based on an adjustment of the beam splitter and/or the reference input interface of the module to align and/or optimise the fringe patterns and fringe frequencies of the adapted object wave and of the reference wave.

More details with respect to the module 100 are described in reference to FIGS. 2 to 9.

Figure 2:
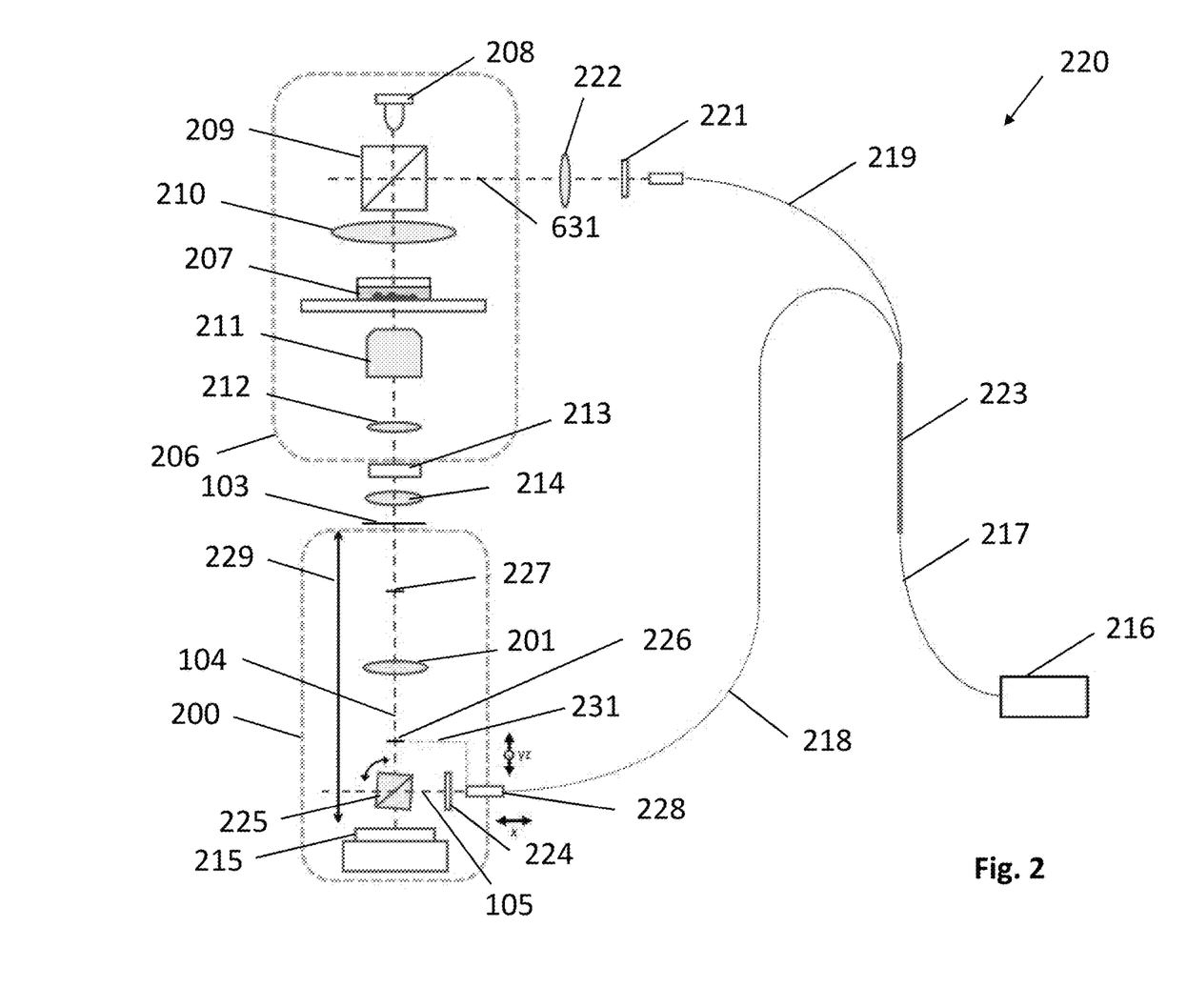
FIG. 2 shows a further module according to various embodiments as part of a digital holographic microscopy arrangement.

FIG. 2 shows a module 200 according to various embodiments as part of a digital holographic microscopy (DHM) arrangement 220 (or a digital holographic microscope). The module 200 may include one or more or all of the features of module 100 described in connection with FIG. 1.

The module 200 may be integrated into (e.g. attached to, or be part of) common commercial inverse and upstanding or upright microscope systems. The digital holographic microscopy (DHM) arrangement 220 of FIG. 2 shows the DHM module 200 integrated with an inverted microscope 206.

The microscope 206 may include a white light source 208 (e.g. a light emitting diode LED), configured to illuminate the sample 207. The sample 207 to be studied and/or imaged may be arranged in a chamber, or on an object carrier slide, for example. A sample stage for carrying the sample 207 may be located between the condenser lens 210 and the microscope objective lens 211. The microscope 206 may further include a beam splitter 209 (also referred to as the second beam splitter 209), such as a 50:50 beam splitter cube, located between the white light source 208 and the condenser lens 210 of the microscope 206. The microscope 206 may further include one or more microscope lenses (e.g. microscope objective lenses) 211 arranged on the opposite side of the sample as the condenser lens 210, the beam splitter 209, and the white light source 208. The microscope 206 may further include a tube lens 212 located between the microscope lens 211 and a camera port interface 213 of the microscope 206. Also, further lenses which deliver the light/image to the camera port may be provided.

The DHM arrangement 220 may include a coherent light source 216 (e.g. a laser) and single mode optical fibers 217, 218, 219. The light emitted by the coherent light source 216 may be in the visible (VIS) or near infrared (NIR) spectral range. The required coherence length may range from a few centimeters to several meters, for example. As an example, the coherent light source 216 may be a solid state laser, wherein the object wave of the intermediate image includes a converging wave front, such as a frequency doubled Nd:YAG laser (e.g., λ=532 nm, P≈10 mW) or a diode laser. The DHM arrangement 220 may further include a fiber splitter 223. Light emitted from the coherent light source 216 may be divided by the fiber splitter 223 into an object illumination wave (object wave) 631 and a reference wave 105 at ratios ranging from 50:50 to 99:1, such as 90:10. The object wave 631 may be coupled by the single mode optical fiber 219 towards the microscope 206. The reference wave 105 may be guided directly to module 200, such as to the interference arrangement of the module 200 (e.g. to the beam splitter 225 of the interference arrangement) via the single mode optical fiber 218 (e.g. with polarization preservation qualities and suitable for the required laser light, e.g. 532 nm). The optical fiber 218 may be responsible for the generation of the spherical reference wave 105 (laser light) which is not affected by the investigated semi-transparent phase object. Laser light may be coupled via the illumination fiber 219 into the microscope's illumination path via the beam splitter 209 in front of the condenser lens 210. In other words, the object wave 631 received from the coherent light source 216 and white light illumination from the white light source 208 may be received by the beam splitter 209 and coupled into the microscope condenser 210 of the microscope 206, resulting in the illumination of the sample 207. After being scattered, diffracted or transmitted by the sample 207, the object wave passes through the microscope objective lenses 211 responsible for magnification, the tube lens 212 and eventually the microscope's camera port 213. The intermediate image 103 of the sample 207 eventually received by the module 100 may be based on light waves received by the microscope 206 from the external light source (e.g. a white light source 208 and laser 216) and scattered or diffracted by the sample 207. In some examples, an infinity-corrected microscope lens may generate an image in infinity, and the tube lens 212 may collect the image from infinity. Thus, the intermediate image 103 of the sample may be generated near or in the focal plane of the tube lens 212 by a convergent wave.

The (DHM) arrangement 220 may optionally further include a neutral density filter 221 for light intensity adjustment arranged between the optical fiber 219 and the beam splitter 209 of the microscope. Optionally, the (DHM) arrangement 220 may optionally further include a lens 222 located between the neutral density filter 221 and the beam splitter 209 of the microscope.

The DHM module 200 may include a configuration of one lens 201 or two lenses 201, 214 and the beam splitter 225. The lenses 201, 214 may be achromatic lenses. The configuration of one lens 201 or two lenses 201, 214 may be arranged between the tube lens 212 of the microscope 210 and the beam splitter 225 of the module 200. The DHM arrangement 220 may optionally further include the second lens 214 arranged between the first lens 201 of the module 200 and the microscope 206. The second lens 214 may be configured to be adapted to the microscope's camera port interface 213, and/or attached to a camera port interface 213 of the microscope 206. The second lens 214 may be a magnifying or demagnifying lens and may function to adjust the field of view to the camera sensor 215. Optionally, the second lens 214 may be a biconvex lens. The second lens 214 may be configured to generate the intermediate image 103 to be received by the module 200 (e.g. by the adaptive lens arrangement 201 of the module 200) based on light waves related to the sample generated by (and received from) the objective lens 201 and tube lens 212 of the microscope via the microscope's camera port interface 213. The second lens 214 may be configured to generate the intermediate image 103 by receiving light waves related to the sample from the tube lens 212 and adapting the received light waves to a field of view of the imaging sensor arrangement 215. Optionally, the diameter of the second lens 214 may range from 25 mm to 30 mm. The focal length of the second lens 214 may be depend on the intended field of view in the sensor plane (also referred to as image plane or hologram plane) of the imaging sensor arrangement 215. In some embodiments, the second lens 214 may be achromatic if DHM is combined with white light microscopy. Optionally, the second lens 214 may be arranged between the module 200 and the camera port 213 of the microscope 206 (as shown in FIG. 2). Alternatively, the second lens 214 may be part of the adaptive lens arrangement of the module 200 (see FIG. 5). For example, the adaptive lens arrangement of the module 200 may include both the first lens 201 and the second lens 214.

The first lens 201 (e.g. a relay lens) of the adaptive lens arrangement may be configured to generate the adapted intermediate image of the sample 207 based on the intermediate image 103 generated by the second lens 214. For example, the first lens 201 may be configured to generate the adapted intermediate image of the sample by adapting a curvature of the object wave of the intermediate image 103 received from the second lens 214. Optionally, the first lens 201 may receive the intermediate image 103 directly from the tube lens 212 or from the second lens 214 without any other intervening optical elements between them. The first lens 201 may be configured to change the curvature of the object wave in the intermediate image plane 103 from a converging wave front to a diverging wave front, for example. The first lens 201 may be positioned in a 4 f geometry with respect to the intermediate image 103 generated by the second lens 214 as a "wave forming element" (one-to-one imaging configuration). In other words, the first lens 201 may be arranged in a 4 f alignment (the distance 4 f is denoted by 229), in such a way that it images the intermediate image 103 in a 1:1 magnification arrangement onto the camera sensor 215. "4 f geometry" may refer to the distance between the interface receiving the object wave of the intermediate image 103 and the image plane/sensor plane of the imaging device 215 being 4 times the focal length of the lens 201. In some embodiments, "4f geometry" may refer to a distance between the interface receiving the object wave of the intermediate image 103 and a back focal plane 226 of the lens 201, with the beam splitter 225 being placed behind the back focal plane of the lens 201. The first lens 201 may be a biconvex lens having a back focal plane 226 and a front focal plane 227. The focal length, f, of the first lens 201 may depend on the position of the end of the optical fiber 218. For example, the focal length, f, of the first lens 201 may range from between 80 mm and 120 mm. A diameter of the first lens 201 may be 30 mm, for example. In some embodiments, the first lens 201 may be achromatic if DHM is combined with white light microscopy.

The first lens 201 allows for a digital off-axis hologram with an almost parallel spatial interference fringe pattern to be generated. This can be detected by the imaging device 215 and simplifies the calculation of quantitative phase images for detection of optical path length changes by Fourier transformation-based reconstruction methods.

The beam splitter 225 of the interference arrangement may be a 50:50 beam splitter cube arranged between the imaging device 215 (camera sensor) and the back focal point 226 of the first lens 201 of the adaptive lens arrangement (or at the back focal point 226 of the first lens 201). The dimensions of the beam splitter 225 (e.g. 15 mm, or e.g. 20 mm) may be chosen so as to be suitable to fit the field of view in the sensor plane of the imaging device 215.

In addition to the beam splitter 225, the interference arrangement of the module 200 may include the reference input interface 228 configured to receive the optical fiber 218 delivering the reference wave 105 from the coherent light source 216 to the module 200. The end of the single mode optical fiber 218 delivering the reference wave 105 may be positioned at approximately the same distance to the camera sensor 215 as the focal point 226 of the first lens 201 (as shown by the line 231). For example, the optical fiber 218 may be positioned in the same distance (concerning optical path length) as the back focal point 226 to achieve a phase gradient to generate a hologram off-axis spatial carrier fringe pattern which is suitable to be recorded with the camera sensor 215, and suitable to be evaluated with spatial phase shifting or Fourier transformation-based algorithms.

Figure 3:
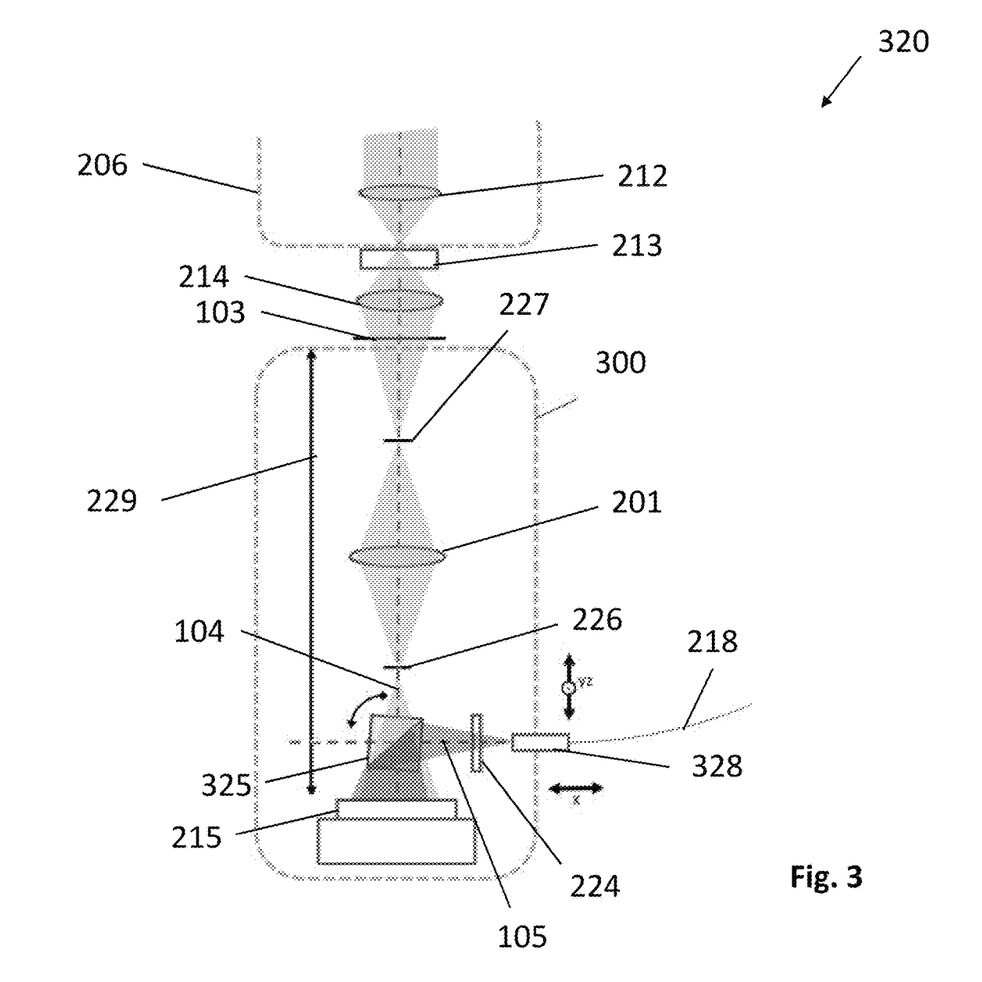
FIG. 3 shows a further module according to various embodiments including a rotatable beam splitter.

In some embodiments, the beam splitter 225 may be rotatable and/or tiltable (See. FIG. 3). Optionally, alternatively or additionally, the optical fiber 218 may be movable in parallel to the optical axis. In some embodiments, a fixed configuration of the optical fiber 218 enables that the unit can be used with microscope objectives 211 of different magnifications in combination with a numerical reconstruction algorithm. In some other embodiments, each magnification change of the optics may be synchronized with a specific internal mechano-optical adjustment (shift) of the optical fiber 218 for the reference wave 105 along the optical axis (x). In this configuration the DHM module can be used with any algorithm for numerical reconstruction. This arrangement allows a simple adaptation of the (parallel) spatial interference fringe pattern to different microscope objectives of different magnifications just by shifting the reference fiber 218 in parallel to the optical axis (x). Without this configuration, interference fringe patterns may be generated that reduce the robustness as well as the processing speed of the numerical evaluation which may be necessary for fast online imaging.

The module 200 may optionally further include a neutral density filter 224 for light intensity adjustment. The neutral density filter 224 may be arranged between the reference input interface 228 and the beam splitter 225.

The DHM arrangement 220 may further include the imaging sensor arrangement 215. The module 200 may include a sensor interface to be connected to the external imaging sensor arrangement 215. Alternatively, the imaging sensor arrangement 215 may be part of the module 200. The imaging sensor arrangement 215 may include a 2-dimensional pixel array for detecting the interference pattern generated by the beam splitter 225, and an image processing arrangement (e.g. a computer) for generating a digital holographic image of the sample based on the interference pattern. The interference pattern (interferogram or hologram) formed by the superimposition of the adapted object wave 104 and the reference wave 105 may be recorded by the (CCD or CMOS) camera 215 and transferred to the image processing system (e.g. a computer) for reconstruction and evaluation of the digitized holograms.

FIG. 3 shows a further DHM module 300 according to various embodiments. The module 300 may include one or more or all of the features of the DHM module described in connection with FIGS. 1 to 2.

The beam splitter 325 of the interference arrangement of the module 300 may be a rotatable or tiltable beam splitter 325, which may be configured to be adjustable (e.g. rotatable or tilted) in at least one axis (x, z or z). For example, in two axes (x-y), or three axis (x-y-z). By adjusting (rotating and/or tilting) the beam splitter, the fringe patterns and the fringe frequencies of the adapted object wave 104 and the reference wave 105 may be better aligned. For example, the rotatable beam splitter 325 may be rotated (e.g. by a few degrees) by a prism mount, to align the off-axis carrier fringe patterns orientation (horizontal, vertical diagonal) and the carrier fringe frequency (e.g. the phase gradient) between the adapted object wave 104 and the reference wave 105 such that it may be recorded by the image sensor 215 and numerically reconstructed by the image processing system to form the image of the sample.

Figure 4:
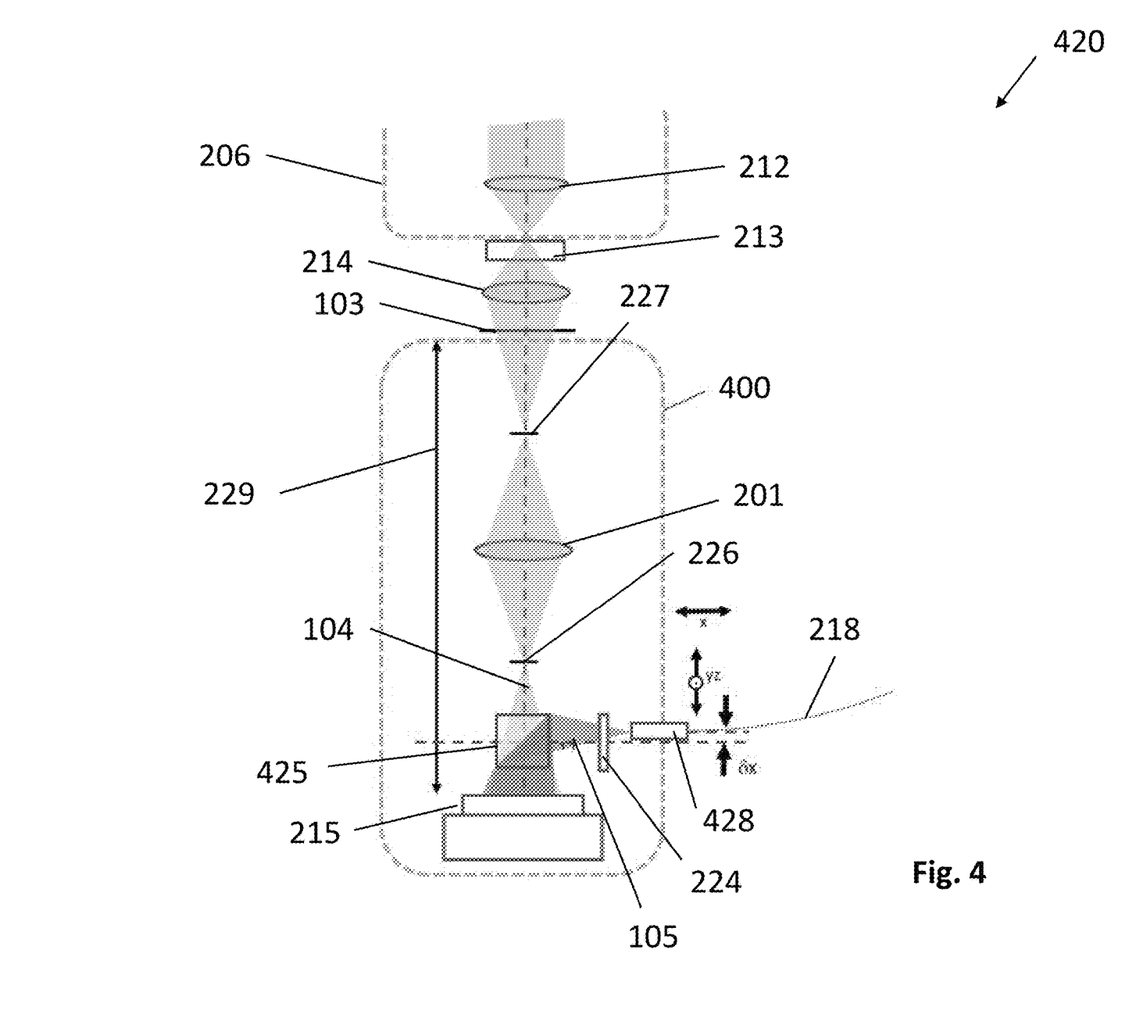
FIG. 4 shows a further module according to various embodiments including a moveable stage.

FIG. 4 shows a further DHM module 400 according to various embodiments. The module 400 may include one or more or all of the features of the DHM module described in connection with FIGS. 1 to 3.

The reference input interface 428 of the interference arrangement of module 400 may be (or may include) a moveable (or motorized) stage 428. The optical fiber 218 may be placed on the x-y-z stage 428 for variable positioning of the fiber in the x, y and z directions. The optical fiber 218 may be shifted by the motorized stage 428 to an off-axis position (δx), which (under some conditions) may generate the same carrier fringe pattern as that in FIG. 3. The position of the reference input interface 228 of the module 400 may be configured to be adjustable with respect to at least two directions (x-y). At least one of the adjustable directions may be in parallel to a propagation direction) of the reference wave leaving the optical fiber 218. The position of the reference input interface 428 may be configured to be adjusted in parallel to the propagation direction of the reference wave leaving the optical fiber 218 based on an adjustment of a magnification of an objective lens 211 of the microscope 206. For example, when the objective lens 211 is changed to a different magnification (e.g. 10×, 20×, 40×), the position of the optical fiber 218 may be shifted (e.g. by the manual or motorized stage 428) along the light propagation direction (e.g. by about a few millimeters) to compensate the difference wave front curvatures in the sensor plane 215.

The off-axis shift of the fiber end in the x-y direction changes the orientation and spatial fringe frequency of the holographic carrier fringe pattern. The shift of the fiber along its optical axis (in the propagation direction of the propagating light leaving the fiber end) changes the curvature of the reference wave 105 in the sensor plane and allows an easy adaptation of the reference wave front 105 to difference curvatures of the object wave 104, which may be caused by different microscope objectives 211, and/or additional inserted optical elements such as the lens 222, and/or different misalignments of the condenser lens 210.

In some embodiments, the DHM module 400 may include a beam splitter 425 that is not adjustable. In some other embodiments, the DHM module 400 may include the rotatable/tiltable beam splitter 325 as described in connection with FIG. 3.

The embodiments of FIGS. 3 and 4 show further DHM modules 300, 400 with optical configurations that may be adapted to most inverted microscopes by the special lens configuration and adjustable optical fibers described in connection with FIGS. 1 and 2. Both embodiments of FIGS. 3 and 4 may eliminate significant artefacts and phase background aberrations, thus improving the quality of quantitative phase imaging. The various embodiments thus allow for DHM to be available for most commercial inverted microscopes which is not possible with current technology.

Figure 5:
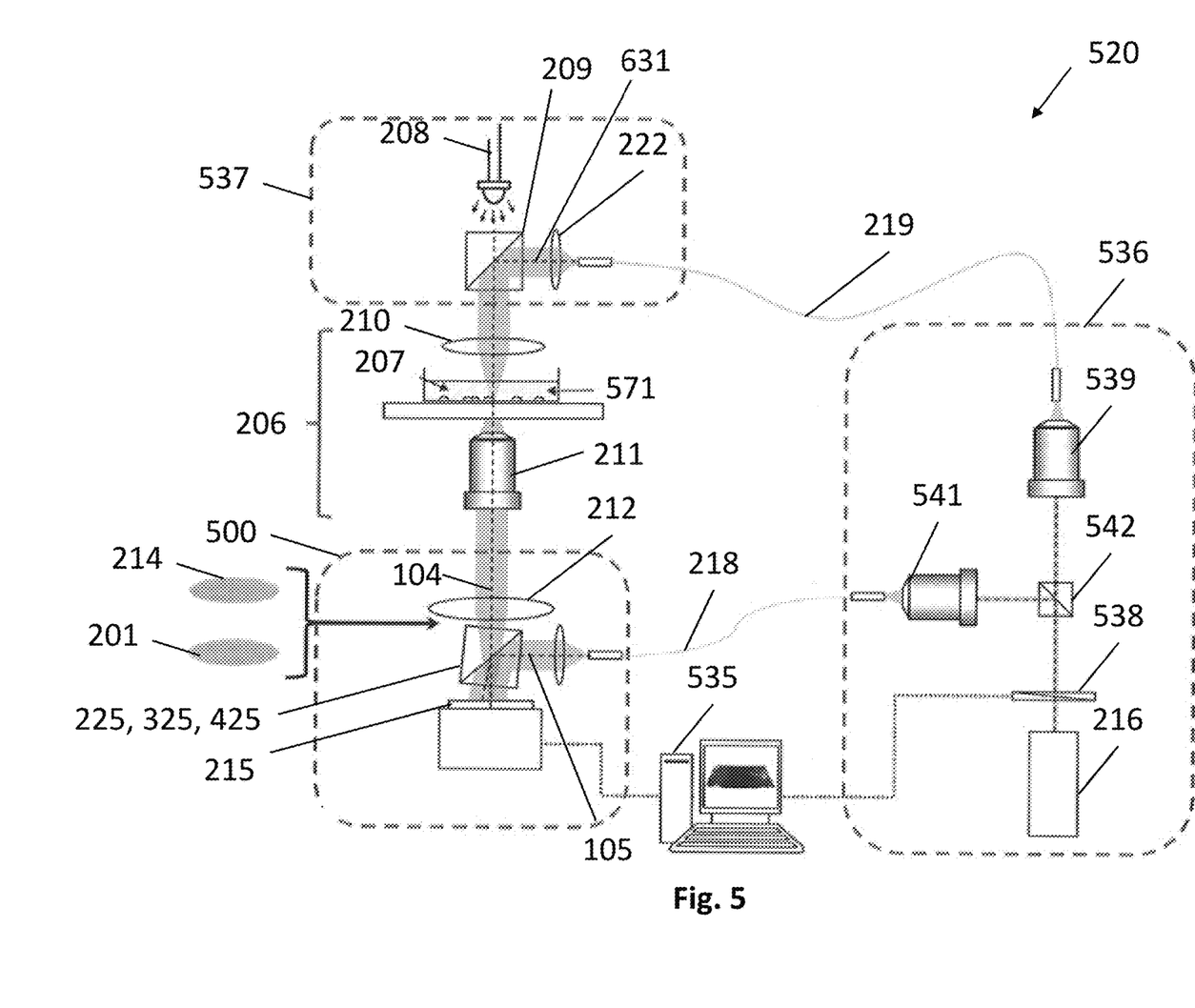
FIG. 5 shows a further module according to various embodiments.

FIG. 5 shows a further DHM module 500 according to various embodiments as part of a digital holographic microscopy (DHM) arrangement 520. The DHM module 500 may include one or more or all of the features of the DHM modules described in connection with FIGS. 1 to 4.

The DHM module 500 integrated with the optical microscope 206, may be referred to collectively as a DHM microscope, which may be used for imaging the sample 207 with a cell culture and medium 571 carried by a stage. The research microscope 206 may include the condenser lens 210, and the microscope objective lenses 211. External to the DHM microscope, the DHM arrangement 520 may include an illumination unit 537, which includes the white light source 208, the (second) beam splitter 209 and the optional lens 222. The DHM microscope may be used for the analysis of various other samples, such as tissue sections arranged on a glass carrier in a mounting medium covered with a cover slip or cells in a liquid buffer medium, for example.

The DHM arrangement 520 may include a laser unit 536 which includes a laser 216, a third beam splitter 542 for splitting a light beam between a first fiber coupler 539 and a second fiber coupler 541. The first fiber coupler 539 may be configured for coupling the objective wave 631 to the optical fiber 219 and the second fiber coupler 541 may be configured for coupling the reference wave 105 to the optical fiber 218. The laser unit 536 may include a shutter 538 arranged between the third beam splitter 542 and the laser 216.

The DHM arrangement 520 further includes the image processing system 535 (e.g. a computer). The interferogram that is formed by the superimposition of the adapted object wave 104 and the reference wave 105 may be recorded by the CCD camera 215 and transferred to the image processing system 535 (e.g. a computer) for reconstruction and evaluation of the digitized holograms. The image processing arrangement 535 may be configured to generate the image of the sample 207 by applying numerical reconstruction algorithms (e.g. spatial phase shifting or e.g. Fourier transformation-based algorithms) to the received interference pattern information to obtain the image of the sample. For example, the image processing arrangement 535 may reconstruct one or more amplitude and/or phase images and/or numerical refocusing.

Figure 6:
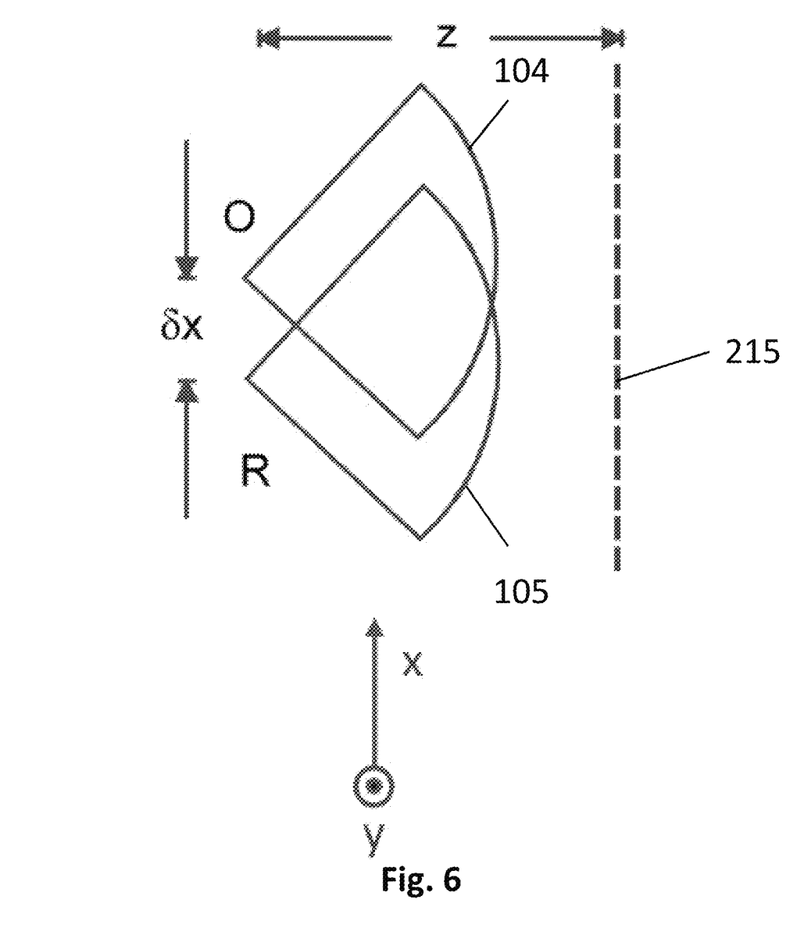
FIG. 6 shows an illustration of the spatial phase gradient generation in the sensor plane.

FIG. 6 shows an illustration of the relationship between spatial phase gradient in the sensor plane and off-axis displacement δx between the object wave O and the reference wave R entering the beam splitter of the DHM module. To generate a hologram which is suitable to be recorded with the camera sensor (CCD or CMOS) with minimized phase noise, the optimum spatial phase shift frequency range may be approximately between 90 degrees and 120 degrees (e.g. between 85 degrees and 115 degrees, or e.g. between 85 degrees and 95 degrees) per pixel. As described in FIGS. 1 to 5, an adaptation of the (parallel) spatial interference fringe pattern to different microscope objectives of different magnifications may be achieved just by shifting the reference fiber in parallel to the optical axis and/or rotating and/or tilting the beam splitter.

The phase difference $\psi$ between the spherical object wave O and the reference wave R, may be described by the equation:

$$\psi(x,y,z) = \phi_R(x,y,z) - \phi_O(x,y,z)$$

The adjustment of the reference fiber in parallel to the optical axis and/or rotating the beam splitter, and the resulting phase difference $\psi$ may be described by using the equation:

$$\psi(x, y=0, z) = \left(\sqrt{(x+\delta x)^2 + z^2} - \sqrt{x^2 + z^2}\right) \cdot \frac{2\pi}{\lambda}$$

where $\lambda$ represents the laser light wavelength. The spatial phase gradient $\beta$ between object waves phase $\phi_O$ and reference waves phase $\phi_R$ may be described by the equation.

$$\beta(x) = \frac{d\psi}{dx} = \left(\frac{\delta x + x}{\sqrt{(x+\delta x)^2 + z^2}} - \frac{x}{\sqrt{x^2 + z^2}}\right) \cdot \frac{2\pi}{\lambda}$$

The corresponding spatial carrier frequency $v_0$ may be calculated for two superimposed spherical waves and is nearly constant for various configurations of the embodiments of described in connection with FIGS. 1 to 6.

$\beta(x) \approx \beta \approx$ constant $\beta = 2\pi v_0$

Figure 7:
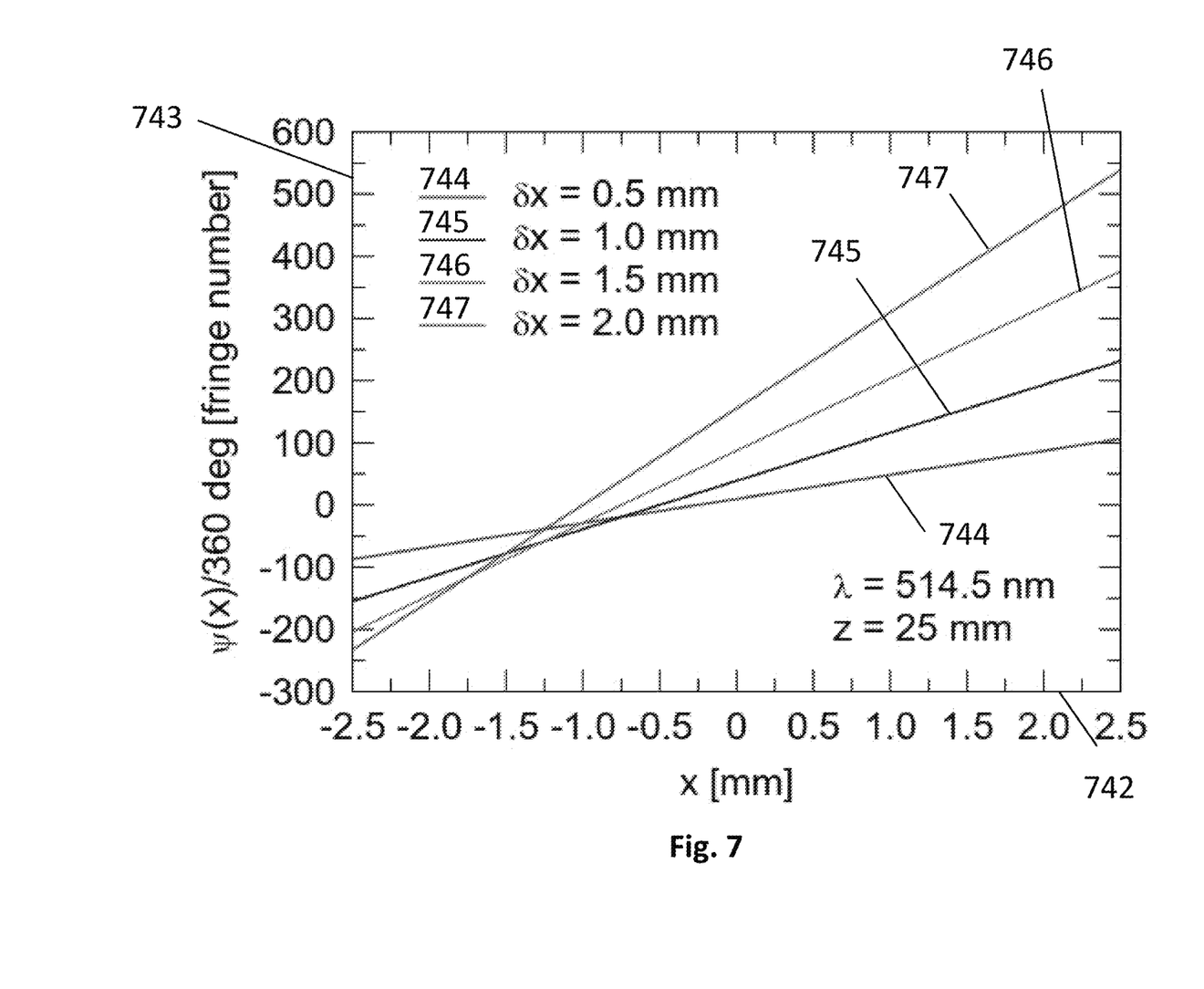
FIG. 7 shows a graph of fringe number with respect to position in the x-plane.

FIG. 7 shows a graph of the interference fringe number ($\psi(x)/360$ deg) 743 with respect to position x mm 742 in the x-plane for different values of $\delta x$. Line 744 represents $\delta x=0.5$ mm. Line 745 represents $\delta x=1.0$ mm. Line 746 represents $\delta x=1.5$ mm. Line 747 represents $\delta x=2.0$ mm. The value of $\delta x=0.5$ mm may result in 112 fringes per 512 pixel, for example.

Figure 8:
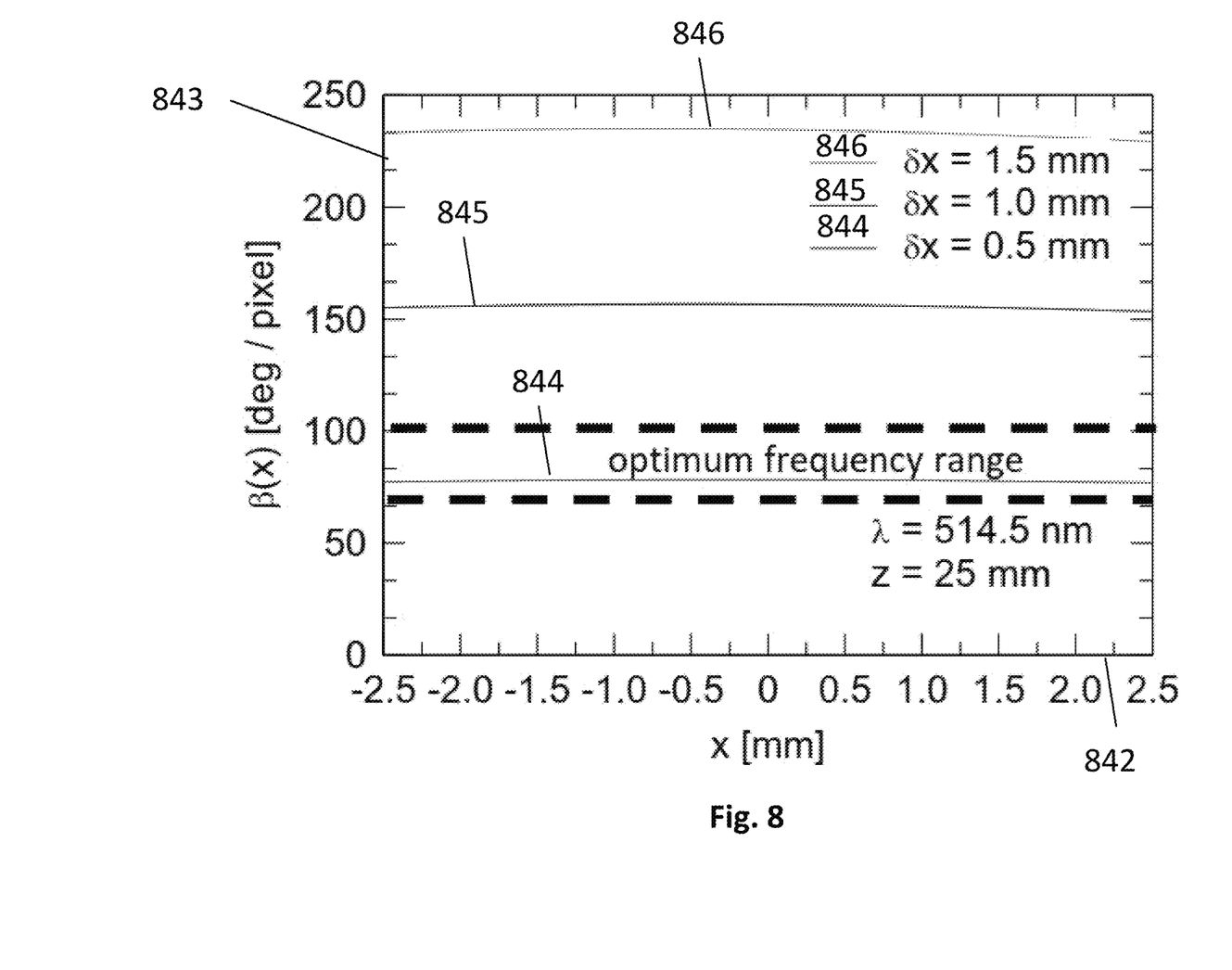
FIG. 8 shows a graph of spatial phase gradient with respect to position in the x-plane.

FIG. 8 shows a graph of spatial phase gradient (degrees per pixel) 843 with respect to position x mm 842 in the x-plane. Line 844 represents $\delta x=0.5$ mm. Line 845 represents $\delta x=1.0$ mm. Line 846 represents $\delta x=1.5$ mm. The value of $\delta x=0.5$ mm may result in a spatial phase gradient of approximately 90 degrees per pixel, which may lie in the optimal frequency range for generating a hologram with minimized phase noise, for example.

Figure 9:
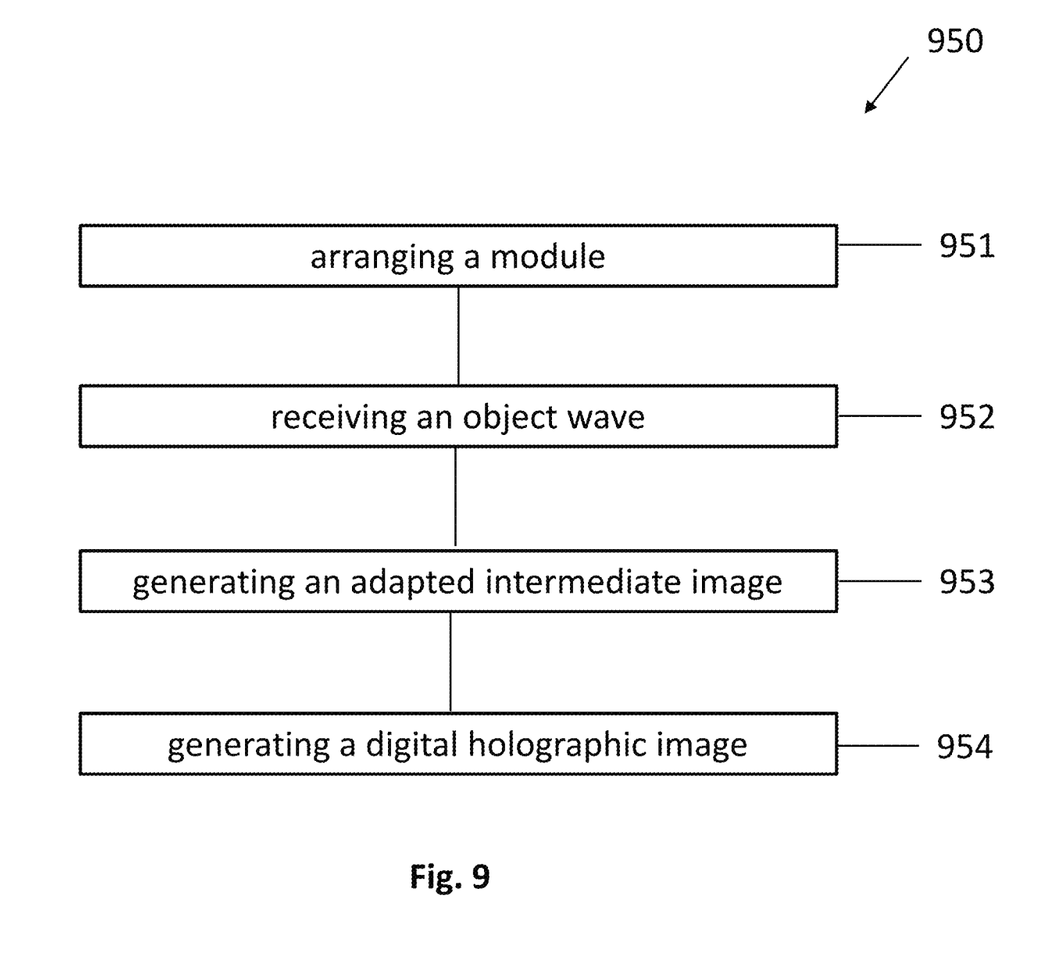
FIG. 9 shows a flow chart of a method for generating a digital holographic image of a sample.

FIG. 9 shows a schematic illustration of a method 950 for generating a digital holographic image of a sample according to various embodiments. One or more or all of the features of the DHM modules 100, 200, 300, 400, 500 and that of the DHM arrangements 220, 320, 420, 520 described with respect to FIGS. 1 to 8 may apply to the method 950.

The method 950 includes arranging 951, with respect to an optical microscope, a module for generating an interference pattern for a holographic image.

The method 950 further includes receiving 952, by an adaptive lens arrangement of the module, an object wave of an intermediate image of the sample.

The method 950 further includes generating 953, by the adaptive lens arrangement, an adapted intermediate image of the sample by adapting a curvature of the object wave of the intermediate image. Optionally, the method 950 may further include generating a hologram/interference pattern (which is recordable by the imaging sensor arrangement) after generating the adapted intermediate image, and before generating the digital holographic image.

The method 950 further includes generating 954, by an imaging sensor arrangement, a digital holographic image of the sample, based on an interference pattern generated by an interference arrangement of the module, wherein the interference pattern is based on the adapted object wave and a reference wave from a coherent light source. For example, the digital holographic image may be generated or obtained by numerical reconstruction of the image from the digital hologram.

The various embodiments herein relate to a modular digital holographic microscope (MDHM). The embodiments relate to an optical configuration in digital holographic microscopy, providing an adaptive system with significant reduction of background phase noise and phase aberration artefacts.

The various embodiments herein relate to spatial phase shifting, wherein a required spatial phase shift between an object wave and reference wave may be generated by an adequate off-axis tilt of one of the waves. The required spatial phase shift may thus be achieved by using the rotatable beam splitter of the DHM module to adjust the adapted object wave and the reference wave, and/or by adjusting a position of the reference input interface with respect the beam splitter of the DHM module.

The various embodiments herein relate to a module 100, 200, 300, 400, 500 including one or two additional lenses and a special positioned optical single mode fiber. This enables a simple physical adjustment of the module to various inverted microscopes and the usage with microscope objectives with different magnifications which is not possible with current configurations.

The DHM module 100, 200, 300, 400, 500 may be adapted cost-efficiently to most inverted microscope models. Higher robustness and significant reduction of phase background aberrations may be achieved. The usage of microscope objectives with different magnifications by unique opto-mechanical adjustment may be achieved. The embodiments may provide a cost-efficient production and an original equipment manufacturer (OEM) DHM unit for various inverted microscope models and simplified usage which is not possible with current off-axis DHM concepts.

The various embodiments allow a simple adaption of a digital holographic microscopy (DHM) module to various inverted microscopes which is not possible with current state of the art configurations for DHM. The use of various microscopic objectives with different magnifications may be achieved by an automated, repositioning of the reference fiber which cannot be achieved which any state of the art DHM configuration. The various embodiments significantly reduce phase aberrations that are caused by changes of the objective lens as well as background phase noise and phase aberration artefacts in the resulting DHM quantitative phase images.

In more detail, the various embodiments disclosed herein enable and simplify the adjustment of the holographic off-axis spatial carrier interference fringes. Advantageously, the phase difference gradient between object and reference wave may lie within the range of approximately 1.6-2.1 radians/pixel (corresponds to 90 to 120 degree/pixel) which may otherwise not be achieved without the present invention in combination with a commercial (inverted) microscope. In the optimum phase gradient range the quantitative phase images that are reconstructed numerically from the recorded digital off-axis holograms show a minimized background phase noise for various numerical reconstruction algorithms, including, for example, spatial phase-shifting-based algorithms that operate in spatial domain, or Fourier transformation-based algorithms that operate in frequency domain. If the phase gradient is not adjusted to lie in the optimum carrier fringe frequency range, significant image disturbances may occur in the reconstructed quantitative phase images.

The embodiment of the adaptive lens arrangement of the module including the first lens and the second lens allows in combination with an adequate adjustment of the position of the optical fiber for generating a spherical reference wave with a substantially identical wave front curvature to that of the object wave. With identical wave fronts of the object wave and the reference wave, substantially ideal parallel off-axis carrier fringes can be generated in the hologram. These can, for example, be computationally compensated in an efficient manner by a shift in the spectral domain during the numerical reconstruction of the quantitative phase contrast images. Not only does this approach offer significant speed advantage, it also provides for a highly homogeneous phase background. Contrastingly, if the wave fronts of the object wave and the reference wave are not identical, curved off-axis carrier fringe patterns are generated, which, when reconstructed with a Fourier transformation-based algorithm, include additional $2\pi$ phase jumps in the reconstructed wrapped phase distributions. This can lead to errors in the subsequently required phase unwrapping process, as more phase jumps lead to a higher probability of errors in the numerical phase unwrapping process. Furthermore, the additional phase jumps in the unwrapped quantitative phase contrast image lead to an inhomogeneous phase background. The artifacts can be numerically compensated subsequently, but this requires considerable additional computational effort and, depending on the algorithm used, can lead to additional other reconstruction artifacts that may affect the image quality of the reconstructed quantitative phase contrast images.

The invention claimed is:

1. A module for generating an interference pattern for producing a digital holographic image, the module comprising:
    an adaptive lens arrangement configured to receive, from a microscope, an object wave of an intermediate image of a sample to be examined, and to generate an adapted object wave of the intermediate image of the sample by reducing a curvature of the object wave of the intermediate image;
    a reference input interface configured to receive an optical fiber delivering a reference wave from the coherent light source to the module and
    an interference arrangement configured to generate an interference pattern to be received by an imaging sensor arrangement, wherein the interference pattern is based on the adapted object wave and the reference wave from a coherent light source;
    wherein a position of the reference input interface of the module is configured to be adjustable with respect to at least two directions (x-y), wherein at least one of the adjustable directions is in parallel to a propagation direction of the reference wave leaving the optical fiber.

2. The module according to claim 1, wherein the adaptive lens arrangement is configured to receive the intermediate image of the sample from a camera port interface of the microscope, wherein the intermediate image of the sample is based on light waves received by the microscope from an external light source and scattered, diffracted or transmitted by the sample.

3. The module according to claim 1, wherein the adaptive lens arrangement comprises a first lens configured to generate the adapted intermediate image of the sample, wherein the adapted intermediate image has substantially a 1:1 magnification with respect to the intermediate image of the sample.

4. The module according to claim 3, wherein the first lens of the adaptive lens arrangement is arranged such that a distance between the interface receiving the object wave of the intermediate image and an image plane/sensor plane of the interference arrangement is 4 times the focal length of the lens.

5. The module according to claim 3, wherein the first lens of the adaptive lens arrangement comprises a biconvex lens.

6. The module according to claim 3, wherein the adaptive lens arrangement further comprises a second lens configured to be attached to a camera port interface of the microscope, wherein the first lens of the adaptive lens arrangement is configured to generate the adapted intermediate image based on the intermediate image generated by the second lens of the adaptive lens arrangement.

7. The module according to claim 6, wherein the second lens is configured to generate the intermediate image by adapting light waves from a tube lens of the microscope to a field of view of the imaging sensor arrangement.

8. The module according to claim 1, wherein the interference arrangement comprises:
    a beam splitter arranged between the imaging sensor arrangement and a back focal point of the adaptive lens arrangement.

9. The module according to claim 8, wherein the interference arrangement is configured to generate the interference pattern based on an adjustment of at least one of the beam splitter and the reference input interface of the module to align fringe patterns and fringe frequencies of the adapted object wave and of the reference wave.

10. The module according to claim 9, wherein the beam splitter is configured to be adjustable in at least one axis (x, y, z) to align the fringe patterns and the fringe frequencies of the adapted object wave and the reference wave.

11. The module according to claim 9, wherein the position of the reference input interface is configured to be adjusted in parallel to the propagation direction of the reference wave leaving the optical fiber based on an adjustment of a magnification of an objective lens of the microscope.

12. The module according to claim 1, wherein the module further comprises the imaging sensor arrangement or wherein the module further comprises a sensor interface to be connected to the imaging sensor arrangement,
    wherein the imaging sensor arrangement comprises a two-dimensional pixel array for detecting the interference pattern and an image processing arrangement for generating a digital holographic image of the sample based on the interference pattern.

13. A digital holographic microscope comprising the module according to claim 1.

14. A method for generating a digital holographic image of a sample, the method comprising:
    arranging, with respect to an optical microscope, a module for generating an interference pattern for a holographic image;
    receiving, by an adaptive lens arrangement of the module, an object wave of an intermediate image of the sample;
    generating, by the adaptive lens arrangement, an adapted intermediate image of the sample by reducing a curvature of the object wave of the intermediate image; and
    generating, by an imaging sensor arrangement, a digital holographic image of the sample, based on an interference pattern generated by an interference arrangement of the module, wherein the interference pattern is based on the adapted object wave and a reference wave from a coherent light source.

* * * * *